United States Patent
Maleky et al.

(10) Patent No.: US 12,394,024 B2
(45) Date of Patent: Aug. 19, 2025

(54) SYSTEM AND METHOD FOR TRAINING OF NOISE MODEL USING NOISY SIGNAL PAIRS

(71) Applicant: SAMSUNG ELECTRONICS CO., LTD., Suwon-si (KR)

(72) Inventors: Ali Maleky, Toronto (CA); Marcus Anthony Brubaker, Toronto (CA); Michael Scott Brown, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 17/984,755

(22) Filed: Nov. 10, 2022

(65) Prior Publication Data
US 2023/0153957 A1 May 18, 2023

Related U.S. Application Data
(60) Provisional application No. 63/279,592, filed on Nov. 15, 2021.

(51) Int. Cl.
*G06K 9/40* (2006.01)
*G06N 3/084* (2023.01)
*G06T 5/70* (2024.01)

(52) U.S. Cl.
CPC ............ *G06T 5/70* (2024.01); *G06N 3/084* (2013.01); *G06T 2207/20081* (2013.01); *G06T 2207/20084* (2013.01)

(58) Field of Classification Search
CPC ............ G06T 5/70; G06T 2207/20081; G06T 2207/20084; G06T 5/60; G06N 3/084;
(Continued)

(56) References Cited

U.S. PATENT DOCUMENTS 9,779,727 B2 10/2017 Yu et al.
10,417,746 B2 9/2019 Murakami et al.
(Continued)

FOREIGN PATENT DOCUMENTS

| CN | 111709891 A | 9/2020 |
|---|---|---|
| JP | 7284688 B2 | 5/2023 |
| KR | 10-2021-0116923 A | 9/2021 |

OTHER PUBLICATIONS

International Search Report (PCT/ISA/210) issued by the International Searching Authority on Feb. 23, 2023 in corresponding International Application No. PCT/KR2022/017960.
(Continued)

*Primary Examiner* — Xin Jia
(74) *Attorney, Agent, or Firm* — Sughrue Mion, PLLC

(57) ABSTRACT

A noise model is iteratively trained to simulate introduction of noise by a capture device, by use of a denoiser and a training data set of pairs of noisy signals. First and second noisy signals of each pair are independently sampled by the capture device from source information corresponding to the pair. Each iteration of training obtains first and second denoised signals from respective noisy signals, then optimizes at least one loss function which sums first and second terms to train both the noise model and the denoiser, where the first term is based on the first denoised signal and the second noisy signal, and the second term is based on the second denoised signal and the first noisy signal. By using noisy samples, the complexities of obtaining "clean" signals (Continued)

are avoided. By using "cross-sample" loss functions, convergence on undesired training results is avoided without complex regularization.

20 Claims, 5 Drawing Sheets

(58) Field of Classification Search
CPC ...... G06N 3/0455; G06N 3/0464; G06N 3/09; G06N 7/01; G06N 3/045; G06N 3/08
See application file for complete search history.

(56) References Cited

U.S. PATENT DOCUMENTS

| | | | |
|---|---|---|---|
| 10,600,172 B2 | 3/2020 | Fujimoto | |
| 11,216,914 B2* | 1/2022 | Xie | ............ G06T 7/215 |
| 11,348,005 B2 | 5/2022 | Navarrete Michelini et al. | |
| 11,580,327 B2 | 2/2023 | Zhang | |
| 2017/0084286 A1 | 3/2017 | Kim et al. | |
| 2019/0378247 A1 | 12/2019 | Huang et al. | |
| 2020/0234080 A1* | 7/2020 | Ciller Ruiz | ........... G06T 11/008 |
| 2021/0390341 A1* | 12/2021 | Zhang | ................ G06T 5/60 |
| 2023/0351551 A1* | 11/2023 | Velten | ................ G06T 5/73 |

OTHER PUBLICATIONS

Written Opinion (PCT/ISA/237) issued by the International Searching Authority on Feb. 23, 2023 in corresponding International Application No. PCT/KR2022/017960.
Maleky, Ali et al. "Noise2NoiseFlow: Realistic Camera Noise Modeling without Clean Images." 2022 IEEE/CVF Conference on Computer Vision and Pattern Recognition (CVPR) (Jun. 2, 2022), 12 pages.
Abdelhamed, A. et al. "Noise Flow: Noise Modeling With Conditional Normalizing Flows." 2019 IEEE/CVF International Conference on Computer Vision (ICCV) (Aug. 22, 2019), 10 pages, arXiv:1908.08453v1 [cs.CV].
Lehtinen, Jaakko et al. "Noise2Noise: Learning Image Restoration without Clean Data." ArXiv abs/1803.04189 (Oct. 29, 2018), 12 pages, arXiv:1803.04189v3 [cs.CV].
Extended European Search Report issued on Oct. 10, 2024 by the European Patent Office for European Patent Application No. 22893318.0.

* cited by examiner

SYSTEM AND METHOD FOR TRAINING OF NOISE MODEL USING NOISY SIGNAL PAIRS

CROSS-REFERENCE TO RELATED APPLICATIONS

This application is based on, and claims the benefit of priority of, U.S. Provisional Patent Application No. 63/279,592, filed on Nov. 15, 2021, at the U.S. Patent and Trademark Office, which is incorporated by reference herein in its entirety.

BACKGROUND

1. Field

Systems and methods consistent with example embodiments relate to generation and training of noise models, and more particularly, to the training of a noise model simultaneous with a corresponding denoiser using pairs of "noisy" signals, without the assistance of a corresponding "clean" signals.

2. Description of Related Art

Any device which captures information as a signal, whether an antenna, microphone, image or video camera, sensor, or other receiver, can be expected to introduce "noise" during the capture process. This noise is the result of imperfections in the device's design and physical components, and sometimes of environmental factors. The resulting captured signal is therefore not perfectly representative of the information being captured. Noise can be reduced at the time of capture, if not completely avoided, by using equipment with higher quality components, but such is often undesirably expensive.

Instead, developments have been made in "denoising" techniques, which process the noisy signal to remove the effects of noise from the signal after capture. A device or software module which performs such a technique is termed a "denoiser."

Many types of denoisers make use of a "noise model," which is used to simulate the effects of noise on a signal. For digital signals, the noise model is typically a software model applying a transformation to the signal. Noise models can be tailored to simulate the noise commonly introduced by a particular device or model of device, and then a denoiser can be trained or otherwise fine-tuned using, as part of a training set, signals which have deliberately altered by the noise model to contain at least an approximation of the same noise that the actual device would introduce.

Noise models can also be used in the operation of certain types of denoisers. In such cases, both the denoiser and the noise model may be installed or otherwise stored within or in connection with the device itself, such that the device may perform a denoising on its own captured signals.

It is therefore desirable in the field of signal processing to be able to generate a noise model which accurately simulates the noise introduced by a particular signal capturing device, which can then be stored for later use in denoising training and denoiser operations.

SUMMARY

It is an aspect of the disclosed system and method to train a noise model corresponding to a device using only "noisy" images captured by the device.

It is another aspect of the disclosed system and method to simultaneously train a noise model and a denoiser both corresponding to a device.

It is yet another aspect of the disclosed system and method to train a noise model corresponding to a device without unduly complex configuration of a training function.

In accordance with certain embodiments of the present disclosure, a method is provided for training of a noise model to simulate introduction of noise by a capture device. The method includes establishing the noise model and a denoiser. The method further includes obtaining a training data set including at least one pair of noisy signals. The pair of noisy signals include a first noisy signal and a second noisy signal, both the first and the second noisy signals being independently sampled by the capture device from source information corresponding to the pair of noisy signals. The method further includes iteratively training, by at least one processor, the noise model. Each iteration of training includes obtaining a first denoised signal by denoising the first noisy signal using the denoiser, obtaining a second denoised signal by denoising the second noisy signal using the denoiser, and training the noise model and the denoiser each based on optimization of at least one loss function. Each loss function sums at least a first term and a second term, the first term of each loss function being based on the first denoised signal and the second noisy signal, and the second term of each loss function being based on the second denoised signal and the first noisy signal. The method further includes outputting the trained noise model as a trained noise model for the capture device.

In accordance with other embodiments of the present disclosure, a system is provided for training of a noise model to simulate introduction of noise by a capture device. The system includes at least one non-volatile memory electrically configured to store instructions, the noise model, a denoiser, and a training data set. The training data set includes at least one pair of noisy signals. The pair of noisy signals include a first noisy signal and a second noisy signal, both the first and the second noisy signals being independently sampled by the capture device from source information corresponding to the pair of noisy signals. The system further includes at least one processor operatively connected to the at least one non-volatile memory. The at least one processor is configured to execute the instructions to iteratively train the noise model. Each iteration of training includes obtaining a first denoised signal by denoising the first noisy signal using the denoiser, obtaining a second denoised signal by denoising the second noisy signal using the denoiser, and training the noise model and the denoiser each based on optimization of at least one loss function. Each loss function sums at least a first term and a second term, the first term of each loss function being based on the first denoised signal and the second noisy signal, and the second term of each loss function being based on the second denoised signal and the first noisy signal. The at least one processor is further configured to output the trained noise model as a trained noise model for the capture device.

In accordance with still other embodiments of the present disclosure, a non-transitory computer-readable recording medium is provided to have recorded thereon instructions executable by at least one processor to perform a method for training of a noise model to simulate introduction of noise by a capture device. The method includes obtaining a training data set including at least one pair of noisy signals. The pair of noisy signals include a first noisy signal and a second noisy signal, both the first and the second noisy signals being independently sampled by the capture device from source information corresponding to the pair of noisy signals. The method further includes iteratively training the noise model and a denoiser. Each iteration of training includes obtaining a first denoised signal by denoising the first noisy signal using the denoiser, obtaining a second denoised signal by denoising the second noisy signal using the denoiser, and training the noise model and the denoiser each based on optimization of at least one loss function. Each loss function sums at least a first term and a second term, the first term of each loss function being based on the first denoised signal and the second noisy signal, and the second term of each loss function being based on the second denoised signal and the first noisy signal. The method further includes outputting the trained noise model as a trained noise model for the capture device.

Additional aspects will be set forth in part in the description that follows and, in part, will be apparent from the description, or may be realized by practice of the presented embodiments of the disclosure.

BRIEF DESCRIPTION OF THE DRAWINGS

Features and aspects of certain exemplary embodiments of the disclosure will be described below with reference to the accompanying drawings, in which like reference numerals denote like elements, and wherein.

DETAILED DESCRIPTION

Figure 1A:
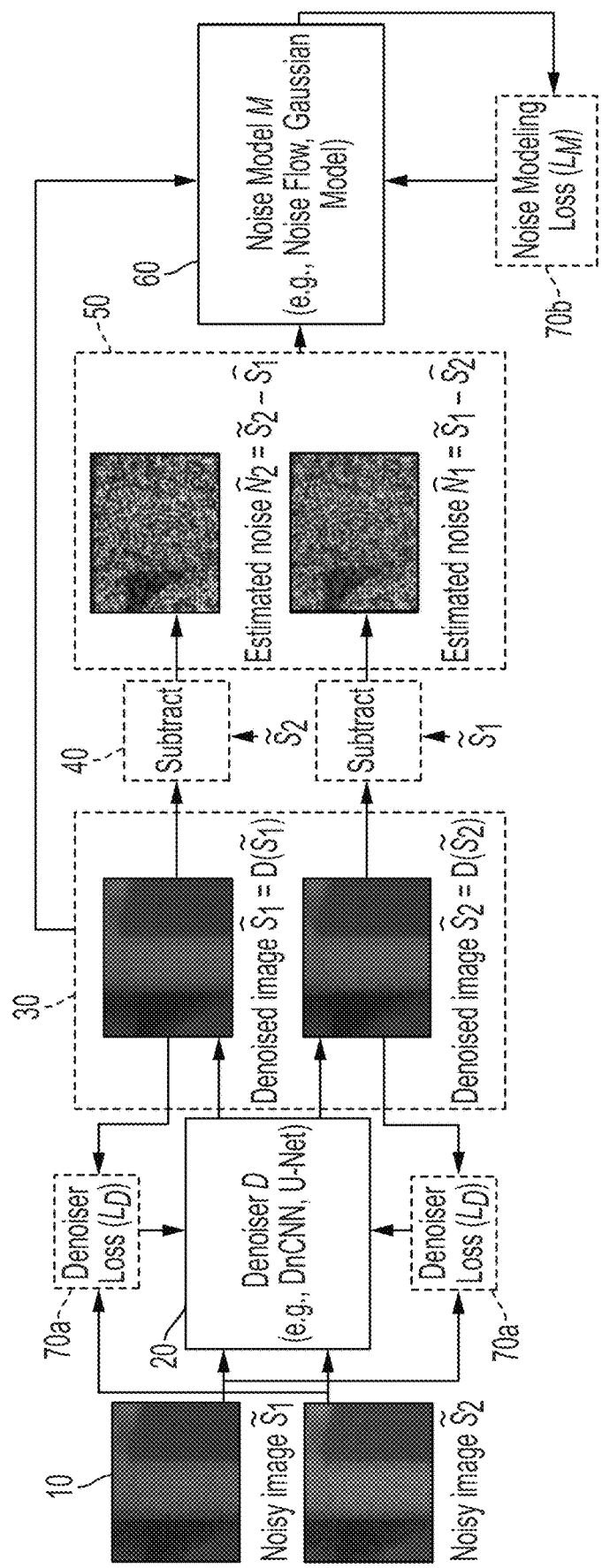
FIG. 1A is a diagram generally illustrating a flow of data in a system for training of a noise model, in accordance with an exemplary embodiment.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, both A and B, or variations thereof.

It is noted that the principles disclosed herein are generally applicable to a variety of captured signals, including but not limited to visual images such as photographs and two-dimensional scans; three-dimensional scans of objects such as light-based scans, laser-based scans, and topographic LiDAR scans; precision approach radar readouts; x-ray images, CRT scans, and other medical imaging outputs; and transmissions of all kinds. However, throughout the disclosure, the signals being processed will be primarily referred to as still images captured by a camera or other image sensor, for convenience and clarity purposes.

As previously discussed, for a device which introduces noise into a signal at the time of capture, a noise model which simulates noise, as it would be introduced to a signal during capture by a device, may be used as part of various denoising techniques to remove this noise or its effects from the captured signal. Such a noise model will not specifically address environmental factors particular to a given moment of capture, but may address an average or typical environmental condition, with variations therefrom addressed by other, supplementary denoising processes.

For brevity, any device configured to capture signals will be described as a "capture device" herein, and an average or typical noise behavior introduced by a particular capture device to a signal during capture will be described as "the noise of the device." Also, a noise model which simulates the noise of a particular capture device, and a denoiser configured specifically to remove the noise of a particular capture device from a signal, will each be described as "corresponding to the device," and a noise model and denoiser both corresponding to the same device will also be described as corresponding to each other.

A noise model may be designed or configured to specifically simulate the noise of a specific capture device, or to generally simulate an average noise of a set of devices of a common design, such as a manufacturing model. Even more generalized noise models are also possible. It will be clear that a general noise model, applicable to a plurality of devices, sacrifices precision for overall production time and cost. For convenience and brevity, a noise model corresponding to a single, specific capture device will be assumed herein, save where correspondence to a set of devices is relevant.

A noise model may be, at its essence, a transformation function or filter to be applied to a signal. This transformation function may include a generic base function which can be adjusted according to values of a set of parameters, these values being collectively denoted φ herein. Because natural noise has a certain level of unpredictability, the noise model may also use "random" noise, which may be sampled from a normal distribution, as a basis, and transform it according to the function and parameters to arrive at noise simulating that of the corresponding capture device. As such, for an original signal S, a function of a noise model M may be expressed as $\tilde{S}=M(S; φ)$, where $\tilde{S}$ is the noisy signal output of the noise model M. Because the noise model may be variable to reflect the unpredictability of natural noise, the output of $M(S; φ)$ may not be consistent; as such, the term "function" is not strictly accurate, but for convenience will be used herein nonetheless.

A noise model may be "trained" to determine values for φ which will most closely simulate the noise of its corresponding capture device. One embodiment of such a training will be described further herein.

A denoiser may be, at its essence, a transformation function or filter to be applied to a noisy signal. This transformation function may include a generic base function which can be adjusted according to values of a set of parameters, these values being collectively denoted θ herein. As such, for a noisy signal $\tilde{S}$, a function of a denoiser D may be expressed as $\hat{S}=D(\tilde{S}; θ)$, where $\hat{S}$ is the denoised signal output of the denoiser.

Certain types of denoisers may be "trained" to determine the values θ for these parameters which will most accurately remove noise introduced by its corresponding capture device. One embodiment of such a training will be described further herein.

This training may be based in part on training data sets comprising noisy signals captured by the corresponding capture device. However, the noisy signals in the training data sets may alternatively be the result of simulated application of noise by a noise model to original signals. Because the original signals without the introduced noise are also available for comparison to the noisy signals, and to denoised versions of the noisy signals produced by the denoiser, training of the denoiser to recognize the introduced noise and remove it is simplified. Additionally, because noise is slightly variable, a single noise model may use a single original signal to generate a large number of noisy signals, each incorporating slightly different noise which is nonetheless representative of the expected noise of the corresponding capture device. The resulting training of the denoiser will therefore be more robust in recognizing the noise of the capture device.

Other types of denoisers may derive values of θ from a noise model corresponding to the capture device; for example, from parameter values φ of the corresponding noise model, in combination with derivation functions related to the base functions of the denoiser and noise models in combination. A "generic" denoiser may therefore be made to correspond to a specific capture device, and to denoise signals captured by said device, based on the parameters or other aspects of a noise model corresponding to said device. As noted previously, such derivation may be one purpose of a noise model. Such derivation processes are known and therefore will not be detailed herein, but it will be understood that, speaking generally, a more accurate denoiser may be derived from a correspondingly more accurate noise model.

The noise model of a capture device may be stored in the device. If the device also has its own denoiser functionality, it can immediately denoise any captured signal based on this noise model. For capture devices without their own denoiser functionality (e.g. due to insufficient processing power or memory capacity), the capture device may encode the noise model as metadata into each captured signal. A generic denoiser in another apparatus may then use the noise model to derive a function and/or parameters for denoising the signal at any convenient time; for example, a display may denoise an image captured by a specific camera, using a noise model corresponding to the camera which has been encoded in the image metadata, immediately prior to displaying the image.

A noise model training process may be generally based on a data set containing signals, and on information derived therefrom in preprocessing. Training data sets and training approaches may use groupings of signals sampled from the same information.

In the related art, groups of signals may comprise at least one "noisy" signal captured by the capture device and at least one "clean" signal representing the same information as the noise signal. The noise model is then trained to transform the clean signal with a training goal of simulating the effects of the noise of the device found in its corresponding noisy signal. As previously noted, because noise has a degree of randomness, the noise model need not duplicate the corresponding noisy signal precisely by the transformation, but instead may be trained to match a noise distribution present in the noisy signal. For brevity, this will be described as "simulating the noise of the device in the signal" herein.

For example, a camera may capture an image of a particular scene, which will be a "noisy" image reflective of the noise of the camera. A "clean" image of the same scene under the same conditions, which has minimal or no noise, is also obtained. The noise model will then introduce noise to the clean image to match the noisy image by adjustment of the various parameter values φ in a noise function, and will store the parameter values which achieve the closest match as representative of the noise in the noisy image. By repeating this process with a plurality of pairs of clean and noisy images, noise due to environmental factors and other uncontrolled variables can be averaged out in the aggregate, and the noise model can determine the noise function parameter values φ which will simulate an average noise of the device.

This style of training has disadvantages centered around obtaining a suitable clean image. To be effective for training, the clean image should duplicate both the captured information and the capture conditions of the noisy images as closely as possible, the only difference being the lack of noise, such that the noise model is trained to simulate that noise without also being influenced by any other variations between the images. However, obtaining such an image is not easily achieved.

Simply substituting another, less noisy camera to capture the clean image is rarely practical, as the angle, lighting, and other factors cannot be easily reproduced with the new camera. Additionally, factors which do not introduce noise per se, but which otherwise alter the nature of the capture from device to device (e.g. available techniques for amplification or enhancement and levels thereof, effective range, flash intensity), will also introduce variations.

An existing denoiser may be used on one or more of the noisy images to produce the clean image. However, the accuracy of the resulting noise model will reflect the effectiveness of the denoiser and the "cleanliness" of the image it produces. This results in the paradox that, to achieve the noise model needed to train or configure an improved denoiser, one must already have the improved denoiser.

In the related art, denoising techniques which are impractical in real-time and under real world conditions are used to generate the clean image. For example, certain techniques use hundreds of carefully captured noisy images of a scene to synthesize a "clean" version of the scene. This process is lengthy, tedious, and processor-intensive, and generates only a single clean image from these hundreds of noisy images.

Mindful of these disadvantages of training a noise model using an approach which requires paired clean and noisy images, a training pre-processing technique is disclosed which removes the need to obtain clean images. Instead, the initial data set contains pairs of noisy images of the same scene, typically captured together. An existing denoiser is then trained simultaneously with the noise model, where the denoiser gradually produces improved denoised images for the noise model to use as the clean image in its own training. This approach avoids the need to produce a clean image using the inefficient approaches described above. Additionally, this approach generates a paired denoiser and noise model both corresponding to the device, either or both of which may be kept for use in various denoising techniques in practice.

FIG. 1A is a diagram generally illustrating a flow of data in a system for training of a noise model, in accordance with an exemplary embodiment.

In summary, a pair of noisy signals 10 (depicted in FIG. 1A as noisy images), both corresponding to the same unavailable clean signal, may be provided to a denoiser 20. The denoiser 20 may denoise each signal to generate a pair of denoised signals 30.

Using a subtraction operation 40 to determine a difference between the respective noisy signals 10 and denoised signals 30, estimated noise values 50 in each of the noisy signals 10 may be determined. In an embodiment, the subtraction operation 40 may determine a difference between one signal of the noisy signal pair and a denoised version of the other signal of the noisy signal pair, for reasons that will be explained later herein.

Both the denoiser 20 and a noise model 60 may then be trained according to one or both of loss functions 70a and 70b, which each make use of one or more of the noisy signals 10, denoised signals 30, and estimated noise values 50 as parameters. The training may have the goal of minimizing or otherwise optimizing the values of loss functions 70a, 70b by modification of parameter values of each of the denoiser 20 and noise model 60. Further details of the loss functions and corresponding training will be described further herein.

The training as a whole may then be repeated with additional pairs of noisy signals until the training is considered sufficient, producing a trained noise model and, optionally, a trained denoiser.

Each of the components, data elements, and operations illustrated in FIG. 1A will be described in more detail herein.

Figure 1B:
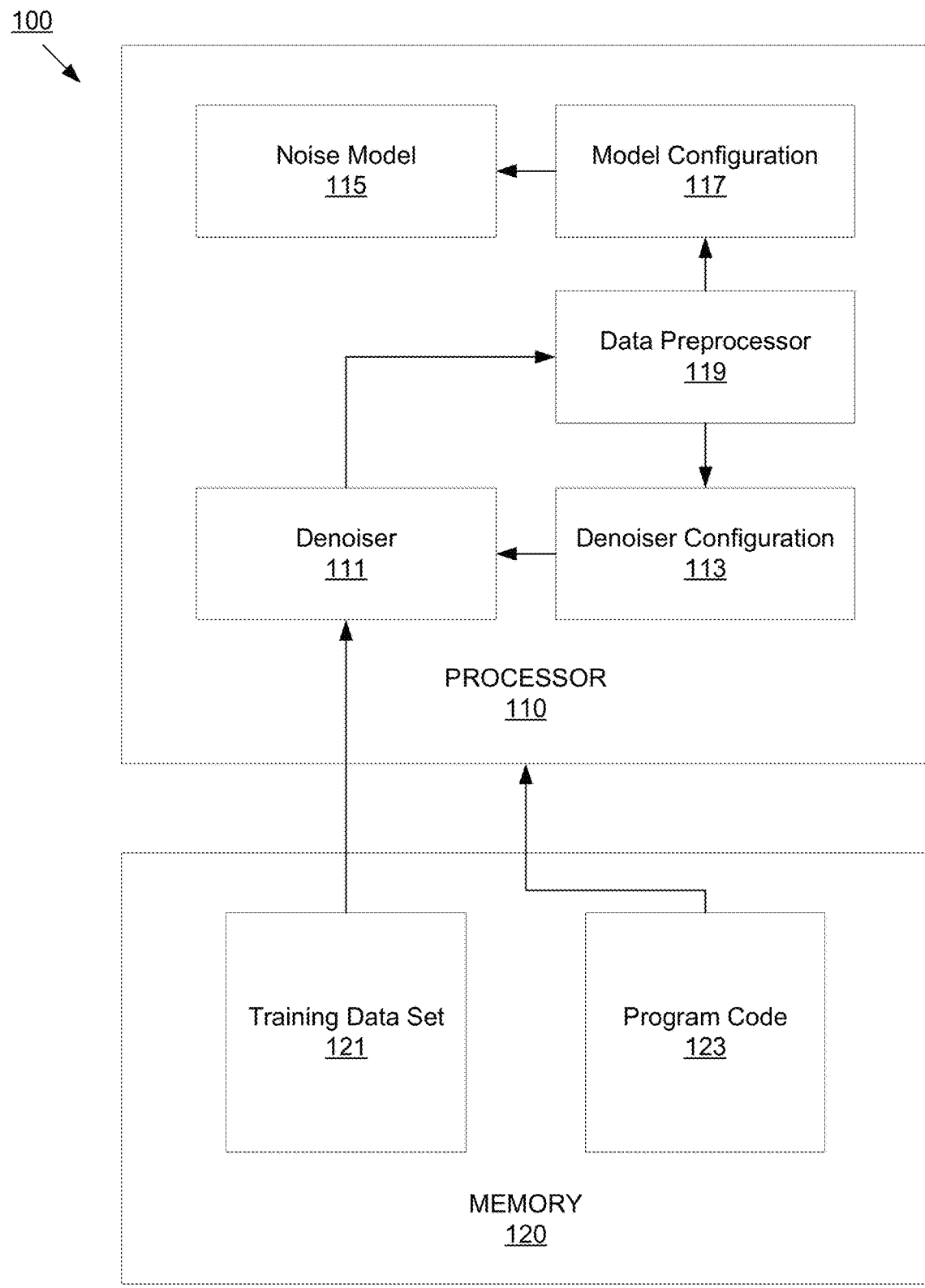
FIG. 1B is a block diagram illustrating a system for training of a noise model, in accordance with an exemplary embodiment.

FIG. 1B is a block diagram illustrating a system 100 for training of a noise model, in accordance with an exemplary embodiment.

The system 100 may comprise a processor 110 and a memory 120 coupled to the processor 110. The memory 120 may be a non-volatile memory, and may more specifically be a non-transitory computer-readable recording medium. The memory 120 may be configured to store a training data set 121, which will be described further herein, and computer program code 123 or other software instructions. The processor 110 may be configured to execute the computer program code 123 or other software instructions.

More specifically, and as depicted herein, various functional modules or units may be embodied as software code executing on the processor 110. It is noted that it is also within the scope of the disclosure for one or more of functional modules depicted in FIG. 1B to be implemented by other forms of systems, such as hard-coded circuits.

A denoiser 111 may take a "noisy" signal as input and produce a "clean" signal as output. As previously described, the denoiser 111 may be expressed as a function, the details of which may be according to a set of parameter values θ. The denoiser 111 may be a trainable denoiser, such as a neural network. For example, the denoiser 111 may be a Denoising Convolutional Neural Network (DnCNN) or a U-Net network, among other neural networks suitable for denoising. In a neural network context, the parameter values θ, or equivalents thereof, may describe the connections between the layers and neurons of the networks, and the inputs and functions of the neurons. Other forms of denoisers are also within the scope of the disclosure.

The denoiser 111 may have a corresponding denoiser configuration unit 113. The denoiser configuration unit 113 may configure the denoiser 111 to denoise a signal according to particular parameters or goals, with, for example, the aim of removing noise resulting from a corresponding capture device. For example, the denoiser configuration unit 113 may train a neural network-based denoiser 111 according to a loss function or cost function. The denoiser configuration unit 113 may alternatively make direct adjustments to the parameter values θ.

A noise model 115 may take a signal as input and simulate the introduction of noise to produce a "noisy" signal as output. As previously described, the noise model 115 may be expressed as a function, the details of which may be according to a set of parameter values φ. The noise model 115 may be a trainable model. One example of a noise model function is a Gaussian function. The "Noise Flow" function and model developed by Abdelhamed et al., "Noise Flow: Noise Modeling with Conditional Normalizing Flows" (2019)) is another example, and is more flexible than Gaussian approaches in simulating a wider variety of complex noise distributions. However, this disclosure is not limited to either Noise Flow models or Gaussian models, and noise model 115 may be any suitable noise model which may be adjusted or otherwise trained to correspond to a specific capture device.

The noise model 115 may have a corresponding model configuration unit 117. The model configuration unit 117 may configure the noise model 115 to add noise to a signal according to particular parameters or goals, with, for example, the aim of simulating the addition of noise by a corresponding capture device. For example, the model configuration unit 117 may adjust the parameter values φ of the noise model 115 according to a loss function or cost function.

The denoiser configuration unit 113 and the model configuration unit 117 may operate concurrently and cooperatively to configure the denoiser 111 and the noise model 115 according to a common goal. The denoiser configuration unit 113 and the model configuration unit 117 may be a single unit or a closely paired set of units.

A data preprocessor 119 may derive additional data from the signals in the training data set 121 for use by the denoiser configuration unit 113 and/or the model configuration unit 117. The data preprocessor 119 may also generate altered versions of the signals in the training data set 121 for input into the denoiser 111 and/or the noise model 115. Certain preprocessing operations will be detailed further herein, but other suitable preprocessing operations may also be part of the functionality of the data preprocessor 119.

While the denoiser 111 and the data preprocessor 119 are depicted as distinct units, it is noted that the operation of the denoiser 111 may be thought of as another form of preprocessing, as the term is commonly understood in the art, for the training of the noise model 115 by the model configuration unit 117. This will be elaborated on further herein.

Figure 2:
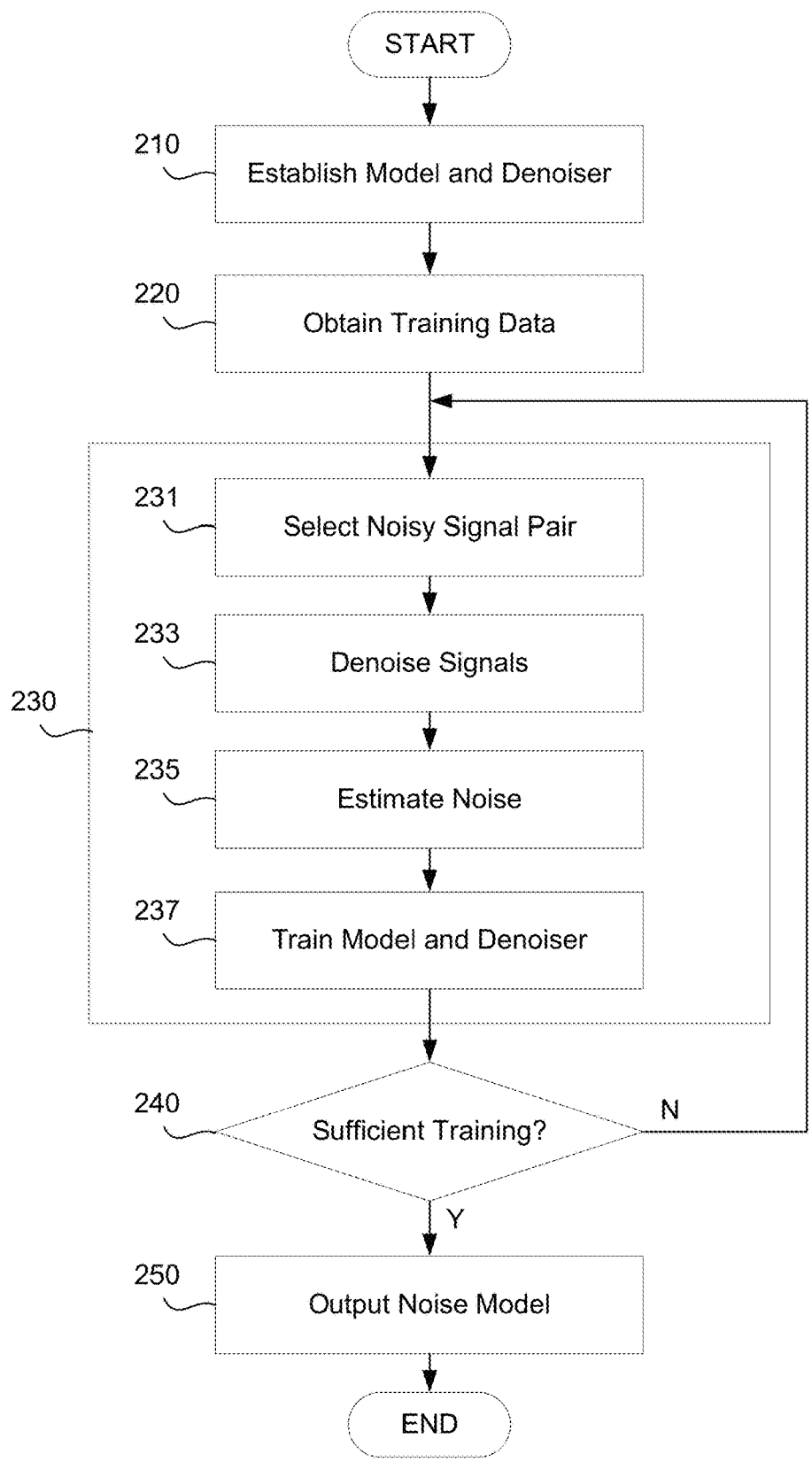
FIG. 2 is a flow diagram illustrating a flow of processes for training of a noise model, in accordance with an exemplary embodiment.

FIG. 2 is a flow diagram illustrating a flow of processes for training of a noise model, in accordance with an exemplary embodiment. These processes may be executed on, for example, the system described in relation to FIG. 1B, but are not limited thereto.

At 210, a noise model and a denoiser may be established. Each of the noise model and the denoiser may be generic and untrained, or may have been previously trained with respect to different if similar capture devices, using the method described herein or other training methods. Even in the latter cases, accurate modeling and denoising is neither expected nor necessary at this stage to the operations that follow.

At 220, a data set for training the noise model may be obtained. The training data set may include pairs of noisy signals. Each pair may be configured as follows:

Let S be a theoretical clean signal which is representative of particular source information. As one example, the signal may be a photograph, and the source information may be the visual information of an object being photographed, viewed from a particular angle and range under particular lighting and visibility conditions. For convenience, the clean signal S and the source information represented in the clean signal S will be referred to interchangeably herein.

Let $\tilde{s}_1$ and $\tilde{s}_2$ be first and second noisy signals in a pair of noisy signals, which have independently captured by the capture device corresponding to the intended noise model. Each of $\tilde{s}_1$ and $\tilde{s}_2$ is an independent sample of the same source information S, and representative of S; that is, $\tilde{s}_1$ and $\tilde{s}_2$ are both noisy versions of the theoretical clean signal S. To accomplish this sampling, $\tilde{s}_1$ and $\tilde{s}_2$ may have been captured in rapid succession under controlled conditions using the capture device, or may be provided with the source information S in a controlled and artificial manner for each capture.

For brevity, noisy signals $\tilde{s}_1$ and $\tilde{s}_2$, as well as the signal pair comprising these signals, will be described herein as corresponding to both the clean signal S and the source information S. The pair may be denoted $\{\tilde{s}_1, \tilde{s}_2\}$, and may also be denoted $\{\tilde{S}\}$ if the pair is the only pair corresponding to source information S in the training data set. For convenience, this will be assumed to be the case herein, save where noted otherwise.

Let $N_1$ be a value representing the noise in $\tilde{s}_1$, and let $N_2$ be a value representing the noise in $\tilde{s}_2$. These values may be defined as $N_1 = \tilde{s}_1 - S$ and $N_2 = \tilde{s}_2 - S$. More generally, the noise N in any noisy signal $\tilde{S}$ corresponding to a clean signal S may be defined as $N = \tilde{S} - S$.

Figure 3:
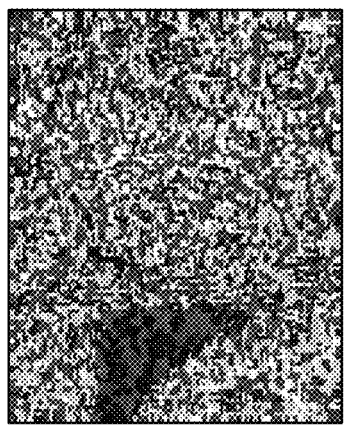
FIG. 3 depicts illustrative examples of clean and noisy images, and of a noise of the noisy image, in accordance with an exemplary embodiment.
Figure 3:
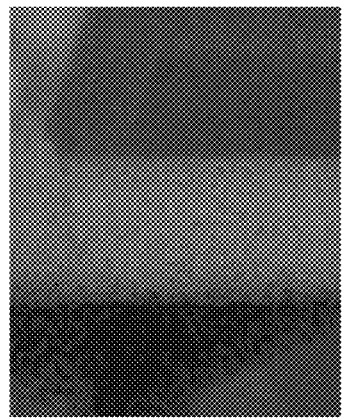
Figure 3:
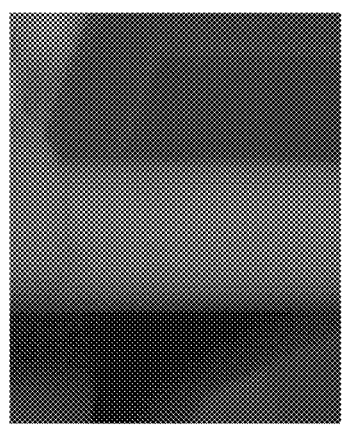

FIG. 3 depicts illustrative examples of each of S, $\tilde{S}$, and N in the context of noisy and clean images, in accordance with an exemplary embodiment. As depicted, the noise N in this context is represented by a difference of pixel information of the clean image S from that of the noisy image $\tilde{S}$. Other approaches to expressing the difference between the clean and noisy images are also within the scope of the disclosure. Similarly, for other types and formats of signals, any clear and consistent expression of a difference between signals may be used to describe the noise N for the purposes of the operations described herein.

It is noted that $N_1$ and $N_2$ may both be strongly affected by the content of S. That is, the same capture device may generate distinctly different noise values when capturing different source information. However, when a capture device captures the same source information (such as S), $N_1$ and $N_2$ may be expected to be very similar.

Returning to FIG. 2, an iteration of a training process may be performed at 230. The iterative training process made be executed on at least one processor, which may be termed a training processor. This training processor may be, for example, the processor 110 of FIG. 1B.

More specifically, at 231, a pair of noisy signals are selected from the training data set. For the description of the training process 230, the selected pair of noisy signals will be denoted as $\{\tilde{S}\}$, a first noisy signal of $\{\tilde{S}\}$ will be denoted $\tilde{s}_1$, a second noisy signal of $\{\tilde{S}\}$ will be denoted $\tilde{s}_2$, and a theoretical clean signal corresponding to both $\tilde{s}_1$ and $\tilde{s}_2$ will be denoted S. In a first iteration, $\{\tilde{S}\}$ may be selected arbitrarily, or in accordance with a sequence defined by the training data set. In later iterations, the selection may take prior selections into account, as will be described further herein.

At 233, a denoiser may denoise each of both $\tilde{s}_1$ and $\tilde{s}_2$. The denoiser may thereby produce two estimates of the clean signal S from both $\tilde{s}_1$ and $\tilde{s}_2$, which are respectively denoted herein as first estimated signal $\hat{s}_1$ ($\tilde{s}_1$ after denoising) and second estimated signal $\hat{s}_2$ ($\tilde{s}_2$ after denoising).

The denoiser may be trained over iterations of the disclosed method, and more specifically over iterations of training process 230, to more accurately denoise a signal from the capture device, such as later pairs of noisy signals from the data set. In a first iteration, an initial form of the denoiser may be an untrained denoiser, or a denoiser previously trained according to a different but similar capture device; for example, if the capture device is a particular camera, the denoiser may have been trained on another camera of the same model, a related model, or a generic camera.

Because a more accurate value for S is expected to be unavailable, due to the difficulty in obtaining such a value previously noted, these estimated signals $\hat{s}_1$ and $\hat{s}_2$ may be used as substitutes for S in the equations $N_1 = \tilde{s}_1 - S$ and $N_2 = \tilde{s}_2 - S$. At least during a first iteration, $\hat{s}_1$ and $\hat{s}_2$ will be only moderately close to S, as the denoiser is unlikely to be accurate without training. However, $\hat{s}_1$ and $\hat{s}_2$ may still each be treated as sufficiently accurate estimates of S for the purposes of the operations that follow. Furthermore, as the denoiser is properly trained, later iterations of the training will produce improved denoised signals which will be closer in value to S.

Therefore, at 235, estimated noise in each of the noisy images $\tilde{s}_1$ and $\tilde{s}_2$ may be determined based on the estimated values of S. Because $N_1 = \tilde{s}_1 - S$, and $N_2 = \tilde{s}_2 - S$, a first estimated noise value $\widetilde{N_1}$ may be calculated as $\widetilde{S_1} - \hat{S_1}$, and a second estimated noise value $\widetilde{N_2}$ may be calculated as $\widetilde{S_2} - \hat{S_2}$. This may be a preprocessing operation, which may be performed by, for example, the data preprocessor 119 of FIG. 1B.

It will be apparent that an average or mean of the two estimated noise values $\widetilde{N_1}$ and $\widetilde{N_2}$ may be expected to be closer to a "true" value of N (in the context of capturing S) than either estimated noise value alone. Such an average may therefore be used in the training operations that follow.

It is noted that other preprocessing operations on $\widetilde{S_1}$, $\widetilde{S_2}$, $\hat{S_1}$, and $\hat{S_1}$, as well as other data in the training set or generated by other components, may also be performed at 235.

At 237, the noise model and denoiser may be trained concurrently. The training process may have a goal of minimizing $L = L_M + \Delta L_D$, where $L_M$ is a loss function for noise model, $L_D$ is a loss function for the denoiser, and is a regularization term or hyperparameter (that is, a set of weights) which balances the relationship between the outputs of the individual loss functions (as there is no natural relationship between $L_M$ and $L_D$). $\Delta$ can also be adjusted, to a degree, to effectively prioritize or deprioritize certain training outcomes. Any suitable process for training neural networks or otherwise adjusting parameter values to minimize a function output, including but not limited to use of gradient descents and variations thereof, may be used for this training.

The noise model loss function $L_M$ may be a function which is optimized based on maximizing a probability of the noise model generating a noisy signal from a corresponding clean or denoised signal. The noise model loss function $L_M$ may more specifically be the Negative Log-Likelihood (NLL) of the estimated noise samples given the estimated clean samples. For example, the noise model loss function may be $L_M = -\log p(\widetilde{N_1} | \hat{S_1}; \varphi) - \log p(\widetilde{N_2} | \hat{S_2}; \varphi)$, where p ($\hat{N}|\hat{S}; \varphi$) is a likelihood that a noise model having parameter values $\varphi$ will generate noise N based on a signal $\hat{S}$. As $\hat{N} = \widetilde{S} - \hat{S}$, a probability of N correlates to a probability of $\widetilde{S}$ when $\hat{S}$ is fixed; thus, it will be understood that an equivalent function is $L_M = -\log p(\widetilde{S_1} | \hat{S_1}; \varphi) - \log p(\widetilde{S_1} | \hat{S_1}; \varphi)$. (It is noted that, if the second function is used, computation of $\widetilde{N_1}$ and $\widetilde{N_2}$ may be optional, and operation 235 may be omitted. However, depending on the probability computation algorithms being used, determining a probability of $\widetilde{N_1}$ and $\widetilde{N_2}$ may be more convenient.) Also, as $\hat{S}$ is determined by denoising $\widetilde{S}$, this function may also be described as $L_M = -\log p(\widetilde{S_1} | D(\widetilde{S_1}; \theta); \varphi) - \log p(\widetilde{S_2} | D(\widetilde{S_2}; \theta); \varphi)$. It will be understood that a noise model may be made more likely to generate $\widetilde{N_1}$ (and therefore $\widetilde{S_1}$) from $\hat{S_1}$ by minimizing the value of $L_M$ through modification of $\varphi$, $\theta$, or both.

The denoiser loss function $L_D$ may be a function which is optimized based on minimizing a difference between a noisy signal and a corresponding denoised signal. The denoiser loss function $L_D$ may more specifically be the Mean Squared Error (MSE) between the noisy signals and the estimated clean samples. For example, the denoiser loss function may be the sum of the squares of the $L_2$ distance between each $\widetilde{S}$ and its corresponding $\hat{S}$: $L_D = \|\widetilde{S_1} - \hat{S_1}\|_2^2 + \|\widetilde{S_2} - \hat{S_2}\|_2^2$. As $\hat{S}$ is determined by denoising $\widetilde{S}$, this function may also be described as $L_D = \|\widetilde{S_1} - D(\widetilde{S_1}; \theta)\|_2^2 + \|\widetilde{S_2} - D(\widetilde{S_2}; \theta)\|_2^2$. $L_D$ may therefore reflect a deviation or "distance" between the noisy signals and the denoised signals; that is, an expectation loss.

In the context of training a denoiser based on an expectation loss, it has been determined that the above loss function is, over sufficient training iterations, equivalent to the loss function $L_D = \|S_1 - D(\widetilde{S_1}; \theta)\|_2^2 + \|S_2 - D(\widetilde{S_2}; \theta)\|_2^2$ in terms of the final training results. This is at least in part because, as the expectation qualities of a noisy $\widetilde{S}$ are sufficiently close to the expectation qualities of the originating clean S, a level of deviation from a sufficiently large number of noisy signals $\widetilde{S}$ is approximately the same as the level of deviation from the originating clean S. It will therefore be understood that a denoiser may be made to generate a cleaner $\hat{S}$ by minimizing the value of $L_D$ through modification of $\theta$. Furthermore, while modification of $\varphi$ has no direct effect on the value of $L_D$, at a high level, an MSE computation has an underlying assumption for the noise model from which the real image noise is sampled, and the noise model is affected by $\varphi$. Therefore, modification of $\varphi$ will also help to optimize $L_D$ over multiple iterations.

It is here noted that both of loss functions $L_M$ and $L_D$ are sums of a first term, which is based on the first denoised signal and the first noisy signal, and a second term, which is based on the second denoised signal and the second noisy signal.

The concurrent training of the denoiser and the noise model may be by a backpropagation algorithm. Backpropagation calculates gradients for all parameters of the model with respect to the loss function L. In this manner, modifications to $\theta$ may have a feedback effect on modifications to $\varphi$, and vice versa, as an optimized $L = L_M + \Delta L_D$ is sought based on both $\theta$ and $\varphi$.

Once both the denoiser and noise model have been trained according to the present pair of noisy images, a current iteration of the training process 230 is completed.

It may therefore be checked at 240 if sufficient iterations of the training process 230 have completed. "Sufficient" may be defined in various ways according to the needs of the specific implementation. Factors may include, but are not limited to: at least a predetermined number of pairs in the training data set have been used in at least one iteration; each pair in the training data set has been so used in at least a predetermined number of iterations; and L has remained below a predetermined threshold value for at least a predetermined number of consecutive iterations. A combination of these factors may also be considered.

If sufficient iterations have been completed ("Yes" at 240), then the noise model may be outputted at 250. Optionally, the denoiser may also be outputted. The method then ends.

Otherwise ("No" at 240"), another iteration of the training process 230 begins.

The next iteration of the training process 230, and more specifically the selection operation 231, may select either the same pair of noisy images or a different pair from the training data set. Using the same pair repeatedly may be expected to provide useful further training, as the trained denoiser will generate different denoised images $\hat{S_1}$ and $\hat{S_2}$ than in the prior iteration, which are expected to be more accurate estimates of S; by extension, different values of estimated noise values $\widetilde{N_1}$ and $\widetilde{N_2}$ may also be computed which are expected to be more accurate estimates of N. From this, a more accurate understanding of how the capture device introduces noise in the context of capturing S may be taught to the noise model. At the same time, by using different pairs of noisy images, each pair corresponding to different information, a more complete understanding of how the capture device introduces noise in different contexts may be taught to the noise model. A mixture of "same pair" and "new pair" iterations is therefore within the scope of the disclosure. Pairs may be selected randomly with each iteration to achieve such a mixture. Additionally, a subset of the pairs in the training data set may be selected, randomly or otherwise, and each pair in the presently selected subset may be used a predetermined number of times before moving on to a next subset.

It will be apparent that the signal pairs in the training data set may be replaced by larger groupings of noisy signals which all correspond to S. If an arbitrary n signals are considered for training in a single iteration of the training process 230, $L_M$ may be expanded to sum n terms instead of merely first and second terms: $-\log p(\widehat{N_1} | \tilde{S}_1; \varphi) - \log p(\widehat{N_2} | \tilde{S}_2; \varphi) - \ldots - \log p(\widehat{N_n} | \tilde{S}_n; \varphi)$. Likewise, $L_D$ may be expanded to: $\|\tilde{S}_1 - \hat{S}_1\|_2^2 + \|\tilde{S}_2 - \hat{S}_2\|_2^2 + \ldots + \|\tilde{S}_n - \hat{S}_n\|_2^2$. By using a larger number of noisy signals corresponding to S, the subtle variations between individual noisy signals due to uncontrolled factors and general randomness can be better considered in a single variation.

An advantage of the specific use of pairs will be described shortly. However, both advantages may be achieved by dividing a larger grouping of noisy signals, which all correspond to the same source information S, into pairs (e.g. a grouping comprising pairs $\tilde{S}_1$ and $\tilde{S}_2$, $\tilde{S}_3$ and $\tilde{S}_4$, . . . , $\widetilde{S_{n-1}}$ and $\widetilde{S_n}$).

In the context of the system 100 depicted in FIG. 1B, a flow of data between the depicted components in FIG. 1B, for the processes of FIG. 2, may be as follows: Some or all of the training data set 121 is retrieved from memory 120 (operation 220) and provided as input to the denoiser 111 over a series of iterations (operation 231). In each iteration, the output of the denoiser 111 (operation 233) is received as input by the data preprocessor 119 for determining the noise estimates (operation 235), and the output of the data preprocessor 119 is provided to both the denoiser configuration unit 113 and the model configuration unit 117. The denoiser configuration unit 113 and the model configuration unit 117 respectively train the denoiser 111 and the noise model 115 (operation 237), and then the next iteration begins.

The training method as described above is sufficient for certain types of noise models, such as Gaussian models, without modification. However, during experimentation in training a Noise Flow model using the above method, it was discovered that the feedback between the denoiser and the noise model in simultaneously trying to minimize L would almost inevitably cause the denoiser function to collapse to an identity function—that is, the parameter values θ would be modified until D(Š; θ)=Š, making no alterations to the noisy image Š at all, as this minimized the value of Š−D(Š; θ) to zero, and therefore minimized each term $\|\tilde{S}-\hat{S}\|_2^2$ to zero in the computation of $L_D$. The noise model would in turn experience a similar convergence toward a zero Dirac delta, as its training was now effectively based on modifying the parameter values φ to optimize −log p(Š|Š; φ). Plainly, the resulting denoiser and noise model would not be useful for either simulating or removing noise.

As a Gaussian model is limited in the forms of noise it can simulate, solutions to the undesired collapse and convergence in a Noise Flow model training were sought. Initially, such could only be prevented by careful and impractically complex configuration of the regularization term directed to this prevention.

Further experimentation, however, identified a simpler solution. This solution exploits the assumption that, for a pair of noisy images captured as defined above, both of the theoretical source images $S_1$ and $S_2$ are effectively identical ($S_1=S_2$), and the noise in each of the noisy images are also effectively identical ($N_1=N_2$), yet it also exploits the limits of these assumptions.

Based on these assumptions and the general definition of N=Š−S, one can extrapolate that $\tilde{S}_1 = \tilde{S}_2$. Furthermore, if the same denoiser D is used on both $\tilde{S}_1$ and $\tilde{S}_2$, one can assume that $\hat{S}_1 = \hat{S}_2$. Therefore, if $\widehat{N_1} = \tilde{S}_1 - \hat{S}_1$, then $\widehat{N_1} = \tilde{S}_1 - \hat{S}_2$; likewise, if $\widehat{N_2} = \tilde{S}_2 - \hat{S}_2$, then $\widehat{N_2} = \tilde{S}_2 - \hat{S}_1$.

Therefore, the above method may be modified such that, at 235, $\widehat{N_1}$ is calculated as $\tilde{S}_1 - \hat{S}_2$, and $\widehat{N_2}$ is calculated as $\tilde{S}_2 - \hat{S}_1$. For brevity, this is termed a calculation of "cross-sample loss" herein, in contrast to the calculation of "same-sample loss" in the unmodified operation 235.

Similarly, the loss functions used in operation 237 are modified to be "cross-sample" loss functions as follows:

$$L_M = -\log p(\widehat{N_1} | \tilde{S}_2; \varphi) - \log p(\widehat{N_2} | \tilde{S}_1; \varphi) = -\log p(\tilde{S}_1 | \tilde{S}_2; \varphi) - \log p(\tilde{S}_2 | \tilde{S}_1; \varphi)$$

$$L_D = \|\tilde{S}_1 - \hat{S}_2\|_2^2 + \|\tilde{S}_2 - \hat{S}_1\|_2^2$$

It is here noted that each of modified loss functions $L_M$ and $L_D$ is a sum of a first term, which is based on the first denoised signal and the second noisy signal, and a second term, which is based on the second denoised signal and the first noisy signal.

The limits to these assumptions are that $\widehat{N_1}$ and $\widehat{N_2}$ will not be perfectly identical, for reasons of small shifts in various uncontrolled factors and general randomness between the captures of $\tilde{S}_1$ and $\tilde{S}_2$, as previously noted. However, they will be sufficiently close that, in general, the calculations of $\widehat{N_1}$, $\widehat{N_2}$, $L_M$, and $L_D$ using cross-sample loss are very close to those using same-sample loss, and are thereby roughly equal in accuracy in estimating of the noise and computing the loss of the device. At the same time, during experimentation, it was determined that the slight resulting variation in the cross-sample loss values prevented the aforementioned collapse and convergence, even without any configuration of the regularization term to counteract it at all, at all, as no values for 0 could consistently reduce $\tilde{S}_1 - D(\tilde{S}_2; \theta)$ to zero.

Experimentation using the above methods, including use of cross-sample loss, showed considerable improvement over other systems, including separated training of a denoiser and a noise model, even with low-complexity values for A.

These and related processes, and other necessary instructions, may be encoded as executable instructions on one or more non-transitory computer-readable media, such as hard disc drives or optical discs, and executed using one or more computer processors, in concert with an operating system or other suitable measures. Likewise, one or more of the above components described above may be implemented as instructions stored on a computer-readable storage medium and executable by at least one processor (and/or may include at least one processor).

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/ or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In a software implementation, the software may include a plurality of computer executable instructions, to be implemented on a computer system. Prior to loading in a computer system, the software may reside as encoded information on a suitable tangible, non-transitory, computer-readable storage medium, such as magnetically, optically, or other suitably encoded or recorded media. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In certain embodiments, the computer-readable storage medium may take the form of pre-existing data storage (such as "cloud storage") accessible through an operably coupled network means (such as the Internet). A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar. The computer-readable program instructions may execute entirely on a user's computer, partly on the user's computer, as a stand-alone software package, partly on the user's computer and partly on a remote computer or server, or entirely on the remote computer or server. In scenarios involving a remote computer or server, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 4:
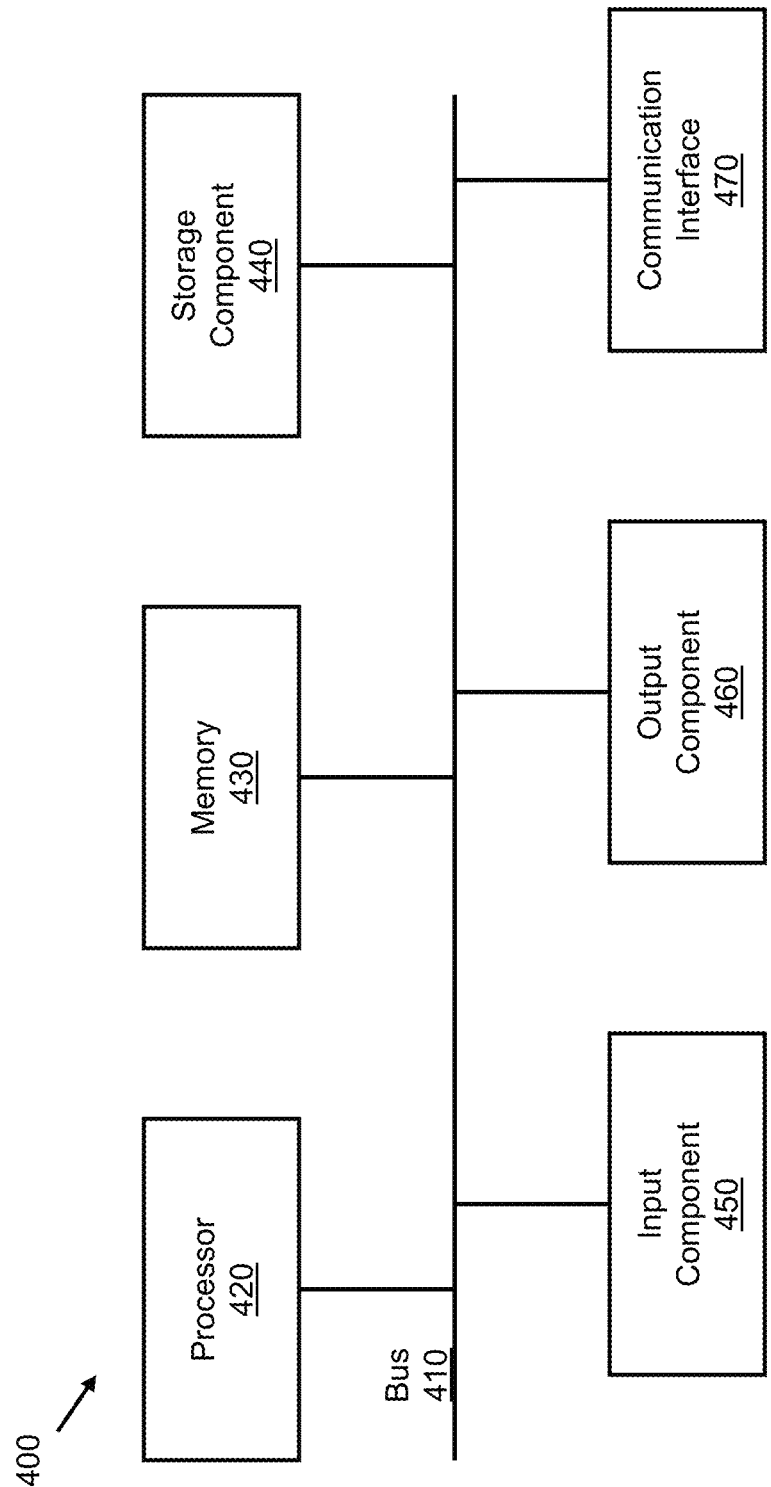
FIG. 4 is a diagram of example components of a device on which embodiments of the systems and/or methods described herein may be implemented.

FIG. 4 is a diagram of example components of a device 400. Device 400 may correspond to system 100. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

In embodiments, any one of the operations or processes of FIG. 2 may be implemented by or using any one of the elements illustrated in FIG. 4.

The foregoing disclosure provides illustration and description, but is not intended to be exhaustive or to limit the implementations to the precise form disclosed. Modifications and variations are possible in light of the above disclosure or may be acquired from practice of the implementations.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for training of a noise model to simulate introduction of noise by a capture device, the method comprising:
   establishing the noise model and a denoiser;
   obtaining a training data set comprising at least one pair of noisy signals, the pair of noisy signals comprising a first noisy signal and a second noisy signal, both the first and the second noisy signals being independently sampled by the capture device from source information corresponding to the pair of noisy signals;
   iteratively training, by at least one processor, the noise model, each iteration of training comprising:
      obtaining a first denoised signal by denoising the first noisy signal using the denoiser,
      obtaining a second denoised signal by denoising the second noisy signal using the denoiser,
      training the noise model and the denoiser each based on optimization of at least one loss function, each loss function summing at least a first term and a second term, the first term of each loss function being based on the first denoised signal and the second noisy signal, the second term of each loss function being based on the second denoised signal and the first noisy signal; and
   outputting the trained noise model as a trained noise model for the capture device.

2. The method of claim 1, wherein the training data set comprises a plurality of pairs of noisy signals, each pair of noisy signals used as the first and the second noisy signals in at least one iteration of training.

3. The method of claim 1, further comprising determining a first noise estimate based on a difference between the first noisy signal and the second denoised signal, and determining a second noise estimate is determined based on a difference between the second noisy signal and the first denoised signal,
   wherein the first term of a first loss function of the at least one loss function is based on the first denoised signal and the second noise estimate, and the second term of the first loss function is based on the second denoised signal and the first noise estimate.

4. The method of claim 3, wherein the first loss function comprises a loss function of the noise model, a second loss function of the at least one loss function comprises a loss function of the denoiser, the loss function of the noise model is based on the first and the second noise estimates and the first and the second denoised signals, and the loss function of the denoiser is based on the first and the second noisy signals and the first and the second denoised signals.

5. The method of claim 4, wherein the first term of the loss function of the noise model is based on a probability of the noise model simulating introduction of the first noise estimate to the second denoised signal, and the second term of the loss function of the noise model is based on a probability of the noise model simulating introduction of the second noise estimate to the first denoised signal.

6. The method of claim 1, wherein the at least one loss function comprises a loss function of the noise model, the first term of the loss function of the noise model is based on a probability of the noise model generating the first noisy signal from the second denoised signal, and the second term of the loss function of the noise model is based on a probability of the noise model generating the second noisy signal from the first denoised signal.

7. The method of claim 6, wherein the loss function of the noise model comprises a negative log-likelihood function.

8. The method of claim 1, wherein the at least one loss function comprises a loss function of the denoiser, the first term of the loss function of the denoiser is based on a difference between the first noisy signal and the second denoised signal, and the second term of the loss function of the denoiser is based on a difference between the second noisy signal and the first denoised signal.

9. The method of claim 8, wherein the loss function of the denoiser comprises a mean squared error function.

10. The method of claim 1, wherein the noise model and the denoiser are concurrently trained by backpropagation.

11. The method of claim 1, wherein the training data set comprises a plurality of pairs of noisy signals, each iteration of the training further comprising selecting one of the plurality of pairs of noisy signals for use as the first and the second noisy signals.

12. The method of claim 11, wherein the selecting of one of the plurality of pairs of noisy signals is based on a presently selected subset of the plurality of pairs of noisy signals.

13. The method of claim 1, wherein the denoiser comprises a neural network.

14. The method of claim 1, wherein the noise model comprises a Noise Flow model.

15. The method of claim 1, wherein the capture device comprises an image sensor, and the first and the second noisy signal each comprise image data.

16. The method of claim 1, further comprising outputting the trained denoiser as a trained denoiser for the capture device.

17. The method of claim 1, further comprising simulating the introduction of noise by the capture device to a signal based on the noise model.

18. A signal denoising method for signals captured by a capture device, the method comprising:
training a noise model to simulate introduction of noise by the capture device, using the method of claim 1; and
denoising a noisy signal captured by the capture device based on parameters of the noise model.

19. A system for training of a noise model to simulate introduction of noise by a capture device, the system comprising:
at least one non-volatile memory electrically configured to store instructions, the noise model, a denoiser, and a training data set, the training data set comprising at least one pair of noisy signals, the pair of noisy signals comprising a first noisy signal and a second noisy signal, both the first and the second noisy signals being independently sampled by the capture device from source information corresponding to the pair of noisy signals; and
at least one processor operatively connected to the at least one non-volatile memory, the at least one processor being configured to execute the instructions to:
iteratively train the noise model, each iteration of training comprising:
obtaining a first denoised signal by denoising the first noisy signal using the denoiser,
obtaining a second denoised signal by denoising the second noisy signal using the denoiser,
training the noise model and the denoiser each based on optimization of at least one loss function, each loss function summing at least a first term and a second term, the first term of each loss function being based on the first denoised signal and the second noisy signal, the second term of each loss function being based on the second denoised signal and the first noisy signal; and
output the trained noise model as a trained noise model for the capture device.

20. A non-transitory computer-readable recording medium having recorded thereon instructions executable by at least one processor to perform a method for training of a noise model to simulate introduction of noise by a capture device, the method comprising:
obtaining a training data set comprising at least one pair of noisy signals, the pair of noisy signals comprising a first noisy signal and a second noisy signal, both the first and the second noisy signals being independently sampled by the capture device from source information corresponding to the pair of noisy signals;
iteratively training the noise model and a denoiser, each iteration of training comprising:
obtaining a first denoised signal by denoising the first noisy signal using the denoiser,
obtaining a second denoised signal by denoising the second noisy signal using the denoiser,
training the noise model and the denoiser each based on optimization of at least one loss function, each loss function summing at least a first term and a second term, the first term of each loss function being based on the first denoised signal and the second noisy signal, the second term of each loss function being based on the second denoised signal and the first noisy signal; and
outputting the trained noise model as a trained noise model for the capture device.

* * * * *